United States Patent [19]
Hills et al.

[11] Patent Number: 4,631,156
[45] Date of Patent: Dec. 23, 1986

[54] SYSTEM AND METHOD OF PARTICULATING 4,4' METHYLENEBIS (2-CHLOROANILINE)

[75] Inventors: Blair H. Hills, Whitehall; Vincent J. Crispino, Big Rapids, both of Mich.

[73] Assignee: Bofors Nobel, Inc., Muskegon, Mich.

[21] Appl. No.: 634,991

[22] Filed: Jul. 27, 1984

[51] Int. Cl.[4] .......................... B02B 5/02; C22B 1/24; B01J 2/16

[52] U.S. Cl. .......................................... 264/37; 264/117; 425/74; 222/361

[58] Field of Search .................... 264/117, 37; 425/74; 222/361; 29/DIG. 63

[56] References Cited

U.S. PATENT DOCUMENTS

| | | | |
|---|---|---|---|
| 3,299,132 | 1/1967 | Dougherty | 264/117 |
| 3,401,089 | 9/1968 | Friedrich et al. | 264/117 |
| 3,711,254 | 1/1973 | McGowan et al. | 264/117 |
| 4,073,838 | 2/1978 | Barnickel et al. | 264/117 |
| 4,230,458 | 10/1980 | Takewell | 264/117 |
| 4,241,137 | 12/1980 | Izumo et al. | 264/117 |
| 4,461,623 | 7/1984 | Casperson | 264/117 |

*Primary Examiner*—Jeanette Hunter
*Attorney, Agent, or Firm*—Price, Heneveld, Huizenga & Cooper

[57] ABSTRACT

The specification discloses a system and method for producing a particulate MBOCA product including relatively uniformly sized granules. The system includes a pan granulator, a dust hood enclosing the granulator pan, and a blower for circulating an air stream through the hood to carry away the heat of fusion of the granulation. In a second aspect, the system includes a novel drum charging apparatus having a filler tube extendable into a drum, a dust cup covering the drum opening when the filler tube is inserted therein, and a vacuum for drawing air through the dust cup. Air displaced from the drum and product particles dispersed therein are therefore drawn into the vacuum for subsequent recovery of product particles.

45 Claims, 11 Drawing Figures

SYSTEM AND METHOD OF PARTICULATING 4,4' METHYLENEBIS (2-CHLOROANILINE)

BACKGROUND OF THE INVENTION

The present invention relates to 4,4'methylenebis(2-chloroaniline), and more particularly to a system and method of manufacturing same as a particulate product having relatively uniformly sized granules.

Methylenebis(2-chloroaniline) (commonly known as MBOCA or MOCA) is widely used as a curing agent for polyurethane elastomers, particularly toluene diisocyanate (TDI). As currently manufactured, MBOCA is typically sold in particulate form wherein the particle sizes range from dust to 3/16 inch. This product is sold in drums and is vacuum-transferred by the user from the drums to the melter of an injection molding device.

Although MBOCA is a known carcinogen in certain laboratory animals, it is not a proven carcinogen in humans. However, the Environmental Protection Agency (EPA) is currently proposing rules regarding the manufacture and/or use of MBOCA; and accordingly, caution dictates that the product be treated with care.

The currently available particulate form of MBOCA can subject users to relatively high levels of exposure. The dust portion of the product is relatively easily dispersed into the air during handling to be inhaled by workers or absorbed through their skin. Rough handling during manufacture and/or use can create additional dust and further aggravate exposure problems. Completely emptying MBOCA dust from the drums is also difficult.

MBOCA can also be absorbed from handling "dirty" drums having MBOCA dust on their outer surface. The dust created by current drum-charging methods often settles on the drums. If the containers are sold "dirty", subsequent handlers are exposed to potentially high levels of MBOCA. If the containers are washed, the manufacturer must decontaminate the wash water.

SUMMARY OF THE INVENTION

The aforementioned problems are solved by the present invention. In a first aspect, a system and method of manufacturing granular MBOCA are provided which produce a granular product wherein substantially all of the granules are of a desired size. The method comprises pan granulating MBOCA to produce the granular product. Preferably, the granular MBOCA exiting the granulator is classified to separate the granules of a desired size from the granules of undesired size. The desired granules are collected in a bin for subsequent charging of product containers, while the undesired granules are returned to the pan granulator. The undesired granules which are oversize are crushed before being returned to the granulator.

This first aspect of the invention produces a MBOCA product wherein substantially all of the MBOCA particles are of a desired, dust-free, size (e.g., 3/16 inch to 5/16 inch). Consequently, the product is relatively easy to handle and, perhaps more importantly, is relatively dust free to reduce its dispersion in air during use to reduce worker exposure. The invention therefore enhances worker safety and will alleviate the anticipated burden of complying with federal rules regarding the handling of this product.

Even more preferably, the granulator is enclosed within a dust hood, and an air or other gaseous stream is circulated through the hood to carry away the heat of fusion of the pan granulation. A dust collector removes MBOCA dust from the air stream, and a heat exchanger cools the air stream. Consequently, a relatively closed loop air stream can be used to further reduce emissions during manufacturing.

In a second aspect, the invention is directed to a system and method for charging MBOCA containers, wherein dispersion of MBOCA into the air is reduced over known charging methods. The system includes a filler tube insertable through the bung hole of a drum, a dust cup surrounding the filler tube and overlying the bung hole, and a vacuum drawn through the dust cup to remove air displaced from the container during charging. The recovery of the displaced air and any MBOCA dust dispersed therein during charging prevents the dust from being emitted to the atmomsphere and enables the dust to be recovered.

The second aspect of the invention therefore results in containers which are relatively "clean". Worker exposure to MBOCA is therefore reduced; and/or the problem of handling a contaminated water stream previously used in washing the containers is eliminated.

These and other objects, advantages, and features of the invention will be more fully understood and appreciated by reference to the detailed description of the preferred embodiment and the drawings.

DETAILED DESCRIPTION OF THE PREFERRED EMBODIMENT

Figure 1:
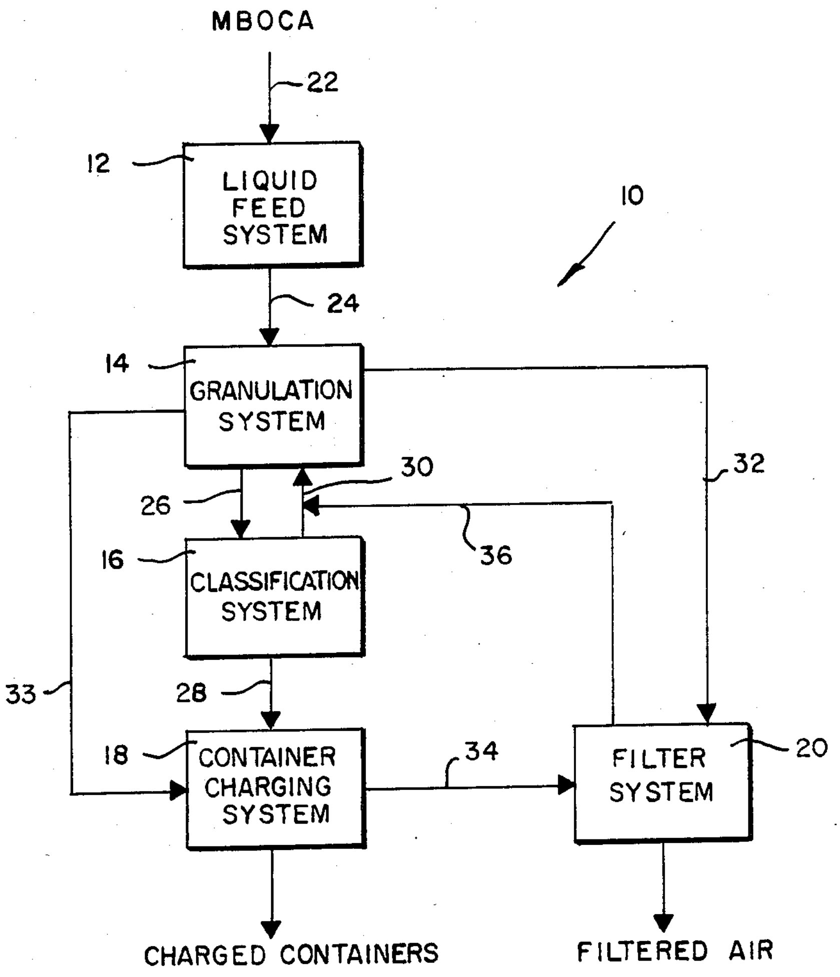
FIG. 1 is a schematic diagram of the present system for manufacturing the granular MBOCA product.

A MBOCA manufacturing system constructed in accordance with a preferred aspect of the invention is illustrated in the drawings and generally designated 10 (FIG. 1). The system includes liquid feed system 12, granulation system 14, classification system 16, container charging system 18, and filter system 20. Bulk MBOCA is introduced to the liquid feed system 12 through line 22. Feed system 12 maintains the MBOCA in liquid form for delivery to granulation system 14 over line 24. System 14 utilizes a pan granulator to granulate MBOCA particles which are delivered to classification system 16 through line 26. System 16 separates the MBOCA granules of a desired size from the MBOCA granules of an undersired size and delivers the properly sized granules to container charging system 18 through line 28. The undesired MBOCA granules are returned through line 30 to granulation system 14 for further processing. Periodically, container charging system 18 is utilized to charge containers with the properly sized MBOCA product.

Filter system 20 interacts with granulation system 14 and container charging system 18 to insure that any air vented to the atmosphere from the manufacturing process is filtered. Each of granulation system 14, classification system 16, charging system 18, and filter system 20 is substantially airtight or enclosed with the exception of the various ducts and lines interconnecting these systems. These ducts and lines are also substantially airtight and sealingly coupled to their various systems and components. Filter system 20 maintains the remainder of system 10 at negative pressure with respect to the ambient air so that MBOCA is not permitted to inadvertently pass out of the system. Purge air exiting the granulation system 14 passes via line 32 to filter system 20. Similarly, air from container charging system 18 passes via line 34 also to the filter system. Particulate MBOCA removed from system discharge air by filter system 20 is returned to granulation system 18 via lines 36 amd 30. Back-flow air flows from granulation system 14 to charging system 18 through duct 33 to provide an air current counter to the product flow through duct 28 to blow MBOCA dust back into granulation system 14 through classification system 16.

System 10 is pneumatically isolated from, and at a lower relative pressure than, the building envelope in which the system is located. That is to say that air within the system is not vented to the building envelope. On the contrary, all air leaving system 10 must pass through filter system 20 to the discharge stack. Consequently, manufacturing emissions are virtually eliminated.

I. Liquid Feed System

Figure 2:
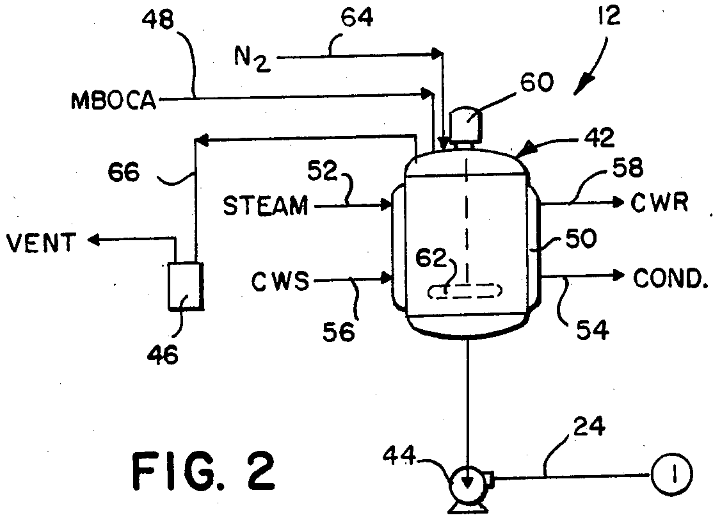
FIG. 2 is a schematic diagram of the liquid feed system.

Liquid feed system 12 (FIG. 2) includes liquid feed tank 42, pump 44, and carbon absorption drum 46. MBOCA is introduced to tank 42 through line 48 at a rate of approximately 350 pounds per hour (hereinafter pph). The MBOCA introduced over line 48 to feed tank 42 is manufactured using conventional techniques. In one such method, MBOCA is synthesized from orthochloroaniline (OCA) and formaldehyde in a conventional acid-catalyzed reaction. Preferably, the MBOCA introduced to feed system 12 is in liquid form directly from the synthesizing process.

Tank 42 includes steam/cold-water jacket 50 which in turn includes steam line 52, condensation line 54, cold water supply line 56, and cold water return line 58. Steam introduced to jacket 50 through line 52 exits as condensation through line 54. Similarly, cold water introduced through supply line 56 exits the jacket via cold water return line 58. Steam and cold water are introduced to jacket 50 as necessary to maintain the MBOCA within tank 42 in liquid form at approximately 105 degrees Centigrade, which is 5 degrees above the freezing point of the MBOCA. Agitator 60 having paddle 62 is included on tank 42 to agitate the liquid therein.

Elemental nitrogen ($N_2$) is introduced through line 64 into the headspace above the MBOCA in tank 42 at a rate of approximately one cubic foot per minute (hereinafter cfm). The headspace is vented through line 66 which passes through the carbon absorption drum 46 so that only "clean" nitrogen returns to the atmosphere.

The liquid MBOCA within tank 42 is delivered to granulation system 14 over line 24. Pump 44 within line 24 pumps at the rate of approximately 350 pph or 0.55 gallons per minute (hereinafter gpm).

II. Granulation System

Granulation system 14 (FIGS. 3 and 4) receives liquid MBOCA from feed system 12 via line 24 and outputs granular MBOCA to classification system 16 via line 26. The granulation system includes pan granulator 68, dust hood 70, dust collector 72, heat exchanger 74, and blower 76.

Pan granulator 68 (FIG. 4) is generally well known to those having skill in the fertilizer manufacturing art. In the preferred embodiment, pan granulator 68 is that made and sold by Feeco International of Green Bay, Wisc., as Model 054 and modified as hereinafter described. Briefly summarizing, granulator 68 includes base 78 rotatably supporting pan or container 80. The base houses a motive means for rotating pan 80 about an axis inclined from vertical. In the preferred embodiment, the axis of rotation can be varied between approximately 30 degrees and 45 degrees from vertical. The inclination of the pan is adjusted using wheel 82, and the rotational speed of the pan is adjusted using wheel 84 to partially regulate the size of granules or particles exiting the pan. Pan 80 (FIG. 4) includes base portion 86 which has floor 88 and sidewall 90 extending generally perpendicularly thereto. Reroll ring 92 is mounted about the periphery of sidewall 90 and in turn includes annular base plate 94 and perpendicular sidewall 96. The diameter of sidewall 96 is larger than the diameter of sidewall 90.

Granules are primarily formed in base pan 86; and, through the appropriate control of the pan granulator, the granules exiting base portion 86 are primarily in the size range 3/16 inch to 5/16 inch. The fully formed granules drop out of the base portion 86 into reroll ring 92 under gravity, where the granules solidify and cool prior to conveyance to classification system 16. The particle size produced by pan granulator 68 is a function of a variety of parameters including the angle of pan 80, the temperature of the granules within the pan, the temperature and feed rate of the MBOCA liquid sprayed into the pan, the rotational speed of the pan, the percent of granules recycled to the pan, and the volume of air circulated through the pan hood. In the preferred embodiment, pan 80 is 54 inches in diameter and is inclined at an angle of approximately 45 degrees from vertical at a rotational speed of from 25 to 30 revolutions per minute (hereinafter rpm).

Arm 98 is fixedly supported by housing 78 and carries a plurality of plows (not shown), such as those used in the manufacture of fertilizer, extending into pan 80 to lift and segregate particles forming within the pan. This stirring classifies the MBOCA particles, causing the relatively large particles to rise to the top of the pan, and improves the exposure of all particles to the liquid MBOCA introduced into the pan. Both the rotation of the pan and the stirring action provided by the plow agitates the granules within the granulator.

The liquid MBOCA is sprayed into pan 80 through nozzle 100 (see FIG. 3) to coat the existing MBOCA particles or nuclei and causing the tackified particles to "twin" or agglomerate to one another. The particles or granules therefore increase in size until they are in the desired size range, at which time they drop into reroll ring 92 from which they further drop to be conveyed to the classification system 16.

Dust hood 70 (FIGS. 3 and 4) encloses pan 80 of granulator 68. Hood 70 is airtight and includes air inlet 102 and air outlet 104 to provide a means of circulating an air or other gaseous stream through the hood. This air stream carries away or removes the heat of fusion of the pan granulated MBOCA and incidentally carries away MBOCA dust. The air stream circulates through hood 70 at approximately 1600 cfm which carries MBOCA dust at approximately 2 pph. The recycle air passes through duct 106 into dust collector 72 which filters the dust from the air. The filtered air exits dust collector 72 through line 108, and the recovered MBOCA dust is returned to pan 80 through line 110 at approximately 2 pph. In the preferred embodiment, dust collector 72 is a Model R32-8 DYNAJET filter/collector manufactured and sold by Kice Metal Products Company, Inc., of Wichita, Kan. This collector provides 297 square feet of cloth area via GORETEX bags. At 1600 cfm, the pressure drop across dust collector 72 is approximately 2–4 inches water column (WC).

The filtered air in line 108 then passes through heat exchanger 74 for cooling. Heat exchanger 74 includes cold water supply line 112 and cold water return line 114 to cool the air stream. In the preferred embodiment, heat exchanger 74 is a Model C-175-6 heat exchanger manufactured and sold by Xchanger Inc., of Hopkins, Minn. Pressure gauges 116 and 118 are connected across dust collector 72 and heat exchanger 74, respectively, and are coupled to appropriate control devices to shut system 10 down if either pressure exceeds predetermined parameters, indicating a "plugged" condition across the filter or heat exchanger.

Blower 76 in line 108 operates at 1800 cfm to force air through line 120 to dust hood 70 at approximately 1600 cfm, through line 32 to filter system 20 at approximately 100 cfm, and through line 33 to charging system 20 at approximately 100 cfm. MBOCA dust is therefore conveyed through lines 120, 32, and 33 at no greater than $2\times10^{-4}$ pph.

As discussed above, the granules formed in granulator 68 first fall into reroll ring 92 where they cool. The granules then exit reroll ring 92 and fall into vacuum pick-up area 122 of dust hood 70, from where they are conveyed via line 26 to classification system 16. The MBOCA dust leaving the pan is carried upwardly through the pan to filter 72 on the air stream traveling from inlet 102 to outlet 104. Approximately 385 pph of product flow through line 26 on a conveying air stream of approximately 200 cfm. The difference between the 350 pph introduced to system 14 on line 24 and the 385 pph exiting the system on line 26 is attributable to the MBOCA returned from classification system 16 and/or filter system 20 via lines 30*a* and 30*b*.

III. Classification System

Classification system 16 (FIG. 5) receives MBOCA granules from granulation system 14 on line 26; delivers properly sized MBOCA particles to container charging system 18 via line 28; returns undesired MBOCA granules to the granulation system via line 30*b;* and returns MBOCA dust and the conveying air stream to the granulation system via line 30*a.* The classification system includes cyclone separator 124, pneumatic transfer fan 126, vibrating screener 128, and crusher 130.

Cyclone separator 124 receives the MBOCA product and conveying air stream on line 26 and separates the granular MBOCA product from the air stream. The conveying air stream and dust are returned through line 30*a* to granulation system 14, and more particularly to pan 80. Fan 126 in line 30*a* operates at approximately 200 cfm and conveys MBOCA dust at approximately 0.1 pph.

The MBOCA granules removed by cyclone separator 124 are delivered to screener 128 at input port 132. In the preferred embodiment, screener 128 is a Model 242 ROTEX dust-tight, two-deck screener manufactured and sold by Rotex Inc., of Cincinnati, Ohio. Top screen 134 is 5/16 inch mesh, while lower screen 136 is 3/16 inch mesh. Consequently, the MBOCA granules are classified into three size ranges. Oversize granules greater than 5/16 inch are outputted through chute 138 to crusher 130. Undersize MBOCA granules under 3/16 inch pass through chute 140 to solids return line 30*b*. Onsize granules in the size range 3/16 to 5/16 inch drop through chute 142 to splitter 144. Depending upon the setting of splitter 144, the onsize particles either drop through chute 28 to the container charging system 18 or drop through chute 146 to crusher 130. Typically, the onsize particles are directed to the charging system; the onsize particles are directed to crusher 130 to replenish and/or increase the number of nuclei or particles within pan 80.

Crusher 130 breaks up oversize granules received through chute 138 and/or onsize granules received through chute 146 to produce particles no larger than $\frac{1}{8}$ inch and discharges the smaller particles through chute 148. In the preferred embodiment, crusher 130 is a HALF NELSON crusher/lumpbreaker manufactured and sold by Jacobson Machine Works, Inc., of Minneapolis, Minn.

Of the 385 pph of MBOCA entering classification system 16 through line 26, approximately 350 pph of onsize product exits through chute 28; 17.4 pph of undersize product exits through chute 140; and approximately 17.5 pph oversize product exits through chute 138. The two recycle chutes 140 and 148 dump directly into solids recycle chute 30*b* for return to granulation system 14.

IV. Container Charging System

Container charging system 18 (FIG. 6) receives onsize MBOCA particles from classification system 16 and stores the particles for subsequent charging or filling of product drums. The charging system includes enclosed airtight product bin 150, and container charging assembly 152 (see also FIG. 7). Bin 150 receives air at 100 cfm from granulation system 14 through line 33 and onsize MBOCA particles through line 28 from classification system 16. The air received through line 33 passes out of bin 150 through line 28 to return to granulation system 14 through classification system 16. This provides an air current counter to the direction of product flow in line 28 to carry MBOCA dust back to the granulation system and reduce the presence of dust in bin 150.

Drums or containers 154 are charged with the onsize MBOCA particles through charging assembly 152. Preferably, charging system 18 is operated approximately one and one-half hours per day, or 45 minutes per 12-hour period. Product drums 154 to be charged with the MBOCA product are transported on conveyor 168. Preferably, the MBOCA product is charged into 30-gallon, plastic-lined drums 154, each of which has a two-inch bung hole 155 (see also FIG. 9). Weighing scales 170 under conveyor section 172 provides a means of weighing the product drums during charging. Containers move through system 18 in the direction indicated by arrow 174. A container 154 is transported to a position on conveyor section 172 under charging assembly 152. The charging assembly is lowered into mating relationship with the bung hole in the container; the container is charged with product until a predetermined weight is attained; and the charging assembly is raised from the container. The container then continues along conveyor 168, and a new container is positioned for filling.

Container charging assembly 152 (FIG. 7) dispenses MBOCA product from bin 150 to the product drums. The charging assembly includes knife gate valve 176, rotary air lock valve 178, slide tube assembly 180, dust cup 182, and actuating mechanism 184. Both of valves 176 and 178 are commercially available valves interconnected sequentially between product hopper 150 and slide tube assembly 180. The slide tube assembly includes inner or upper slide tube 186 which is $3\frac{3}{4}$ inches in diameter and outer or lower slide tube 188 telescopically fitted thereover. Funnel portion 190 interconnects rotary air lock valve 178 and inner tube 186. Vacuum port 192 extends from the side of, and communicates with the interior of, funnel portion 190. The vacuum port is connected to vacuum line 34 through valve 194 (see FIG. 6).

Outer tube 188 (FIG. 7) includes 4-inch diameter upper portion 194 fitted over upper tube 186, lower portion 196 which is $1\frac{1}{2}$ inches in diameter, and funnel portion 198 interconnecting the upper and lower portions. Outer tuber 188 is free to telescope with or slide along inner tube 1186 to vertically shift lower discharge end 200 into and out of bung hole 155 (see also FIG. 9). The length of lower portion 196 depends in part upon the height of containers 154 to be filled. The length is selected such that at least a portion of tubes 186 and 188 interfit when terminal end 200 is positioned within the container.

Dust cup assembly 182 (FIGS. 7 and 9–10) is 4 to 6 inches in diameter and concentrically mounted about lower tube extension 196 above discharge end 200. The dust cup assembly 182 includes dust cup 202, slide neck 204, and nozzle or port 206. Dust cup 202 is generally circular in cross section including upper annular wall 208 on which coupler 204 is mounted preferably by tack welding. In the preferred embodiment, coupler 204 is a Morris QUICKON coupler telescoped over extension 196 and releasably secured thereto via lock 205. Nozzle 206 is mounted on the side of dust cup 202 and communicates with the interior thereof. The nozzle is connected to vacuum line 34 through valve 210 (see FIG. 6).

Shifting assembly 184 (FIG. 7) supports outer tube 188 about inner tube 186. The assembly includes beam 212, which is generally U-shaped in cross section, supported by braces 214 and 216 on opposite ends of rotary air lock valve 178. Air cylinder 218, having approximately a 15-inch stroke, is mounted on beam 212 and includes reciprocating connecting rod 220. Carriage bar 222 is privotally secured to rod 220 and fixedly secured to outer tube 188, for example by welding, such that the outer tube is vertically shifted by actuating the air cylinder 218. Roller arms 224 and 226 are fixedly mounted on support 212 and include rollers 228 and 230, respectively, at their ends. Unistrut 232 is fixedly secured to outer tube 188, again for example by welding, and interfits with rollers 228 and 230 to provide a track along which the outer tube can move.

Figure 6:
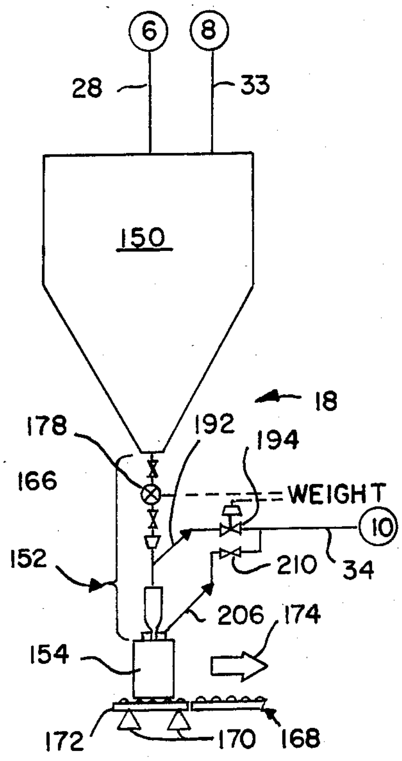
FIG. 6 is a schematic diagram of the container charging system.
Figure 7:
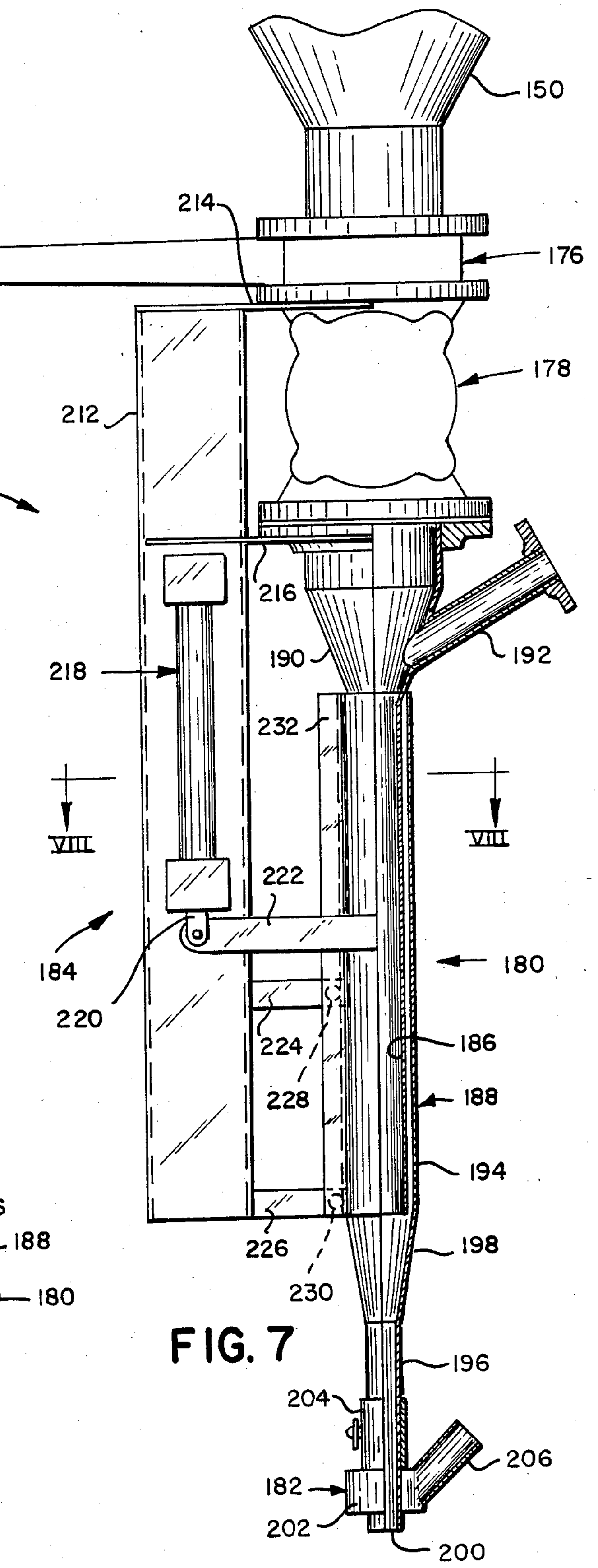
FIG. 7 is an elevational view, partially in section, of the container charging assembly.

As noted above, port 192 and nozzle 206 are coupled through valves 194 and 210, respectively, to vacuum line 34 (FIG. 6). Valve 194 is a full-port ball valve, while valve 219 is adjusted to permit air flow therethrough at approximately 50 cfm. Both rotary air lock valve 178 and valve 194 are responsive to the weight of container 154 as determined by scale 170.

Drums 154 to be charged by assembly 184 are transported along conveyor 168 until positioned directly below charging assembly 184 on conveyor section 172. Air cylinder 218 is actuated to lower outer tube 188 to the position illustrated in FIG. 9 wherein lower end 200 of extension 196 extends into container 154 through bung hole 155 and dust cup 202 seats on or abuts the container about the bung hole. When product is not being charged into a container, valve 194 is open to draw air primarily through lower end 200 of extension 196 and incidentally through the space between inner and outer tubes 186 and 188. Consequently, MBOCA within feed tube 180 is drawn through port 192 to prevent MBOCA from inadvertently being discharged from the charging assembly.

After dust cup 202 is properly seated on container 154, rotary valve 178 is actuated and valve 194 is closed to charge product into the container. Because the vacuum on port 192 is released, product falls through feed tube 180 to enter the drum through lower end 200. The air exiting the drum is drawn through cup 202 and nozzle 206 to vacuum line 34. Air is also drawn from any space between dust cup 202 and container 154. When drum 154 reaches the desired weight as detected by scales 170, indicating that charging is complete, rotary valve 178 is deactivated and valve 194 is reopened.

If the drum is overcharged, the opening of valve 194 will draw the overcharged product from drum 154 through terminal end 200. Outer tube 188 is then raised by actuating air cylinder 218 to the position illustrated in FIG. 7. A RIEKE cap is installed on bung hole 155, and drum 154 is transported along conveyor 168 to a storage area.

Drums filled with the charging assembly of the present invention are substantially uncontaminated on their outer surface. The unique vacuum structure of the charging assembly substantially insures that MBOCA is not inadvertently discharged from the drum during charging. The air within the drum, including any dust created by charging, is drawn directly through dust cup port 206 and sent to filter system 18.

V. Filter System

Filter system 20 (FIG. 11) receives granulation system purge air via line 32 and building air via line 234, and filters this air which is discharged to the atmosphere. Additionally, the filter system receives charging assembly air via line 34; separates the MBOCA dust and MBOCA granules therefrom; returns the MBOCA dust and the MBOCA granules to granulation system 14 via lines 36 and **30*b* (see FIGS. 3 and 5**); and also filters and discharges this air stream.

The filter system includes industrial vacuum system 236, a pair of "absolute" filters **238*a* and 238*b* and a pair of blowers 240*a* and 240*b*. Air is drawn by vacuum system 236 through line 242 at approximately 50 to 300 cfm from charging assembly line 34 and clean-up stations 244. One clean-up station is provided on each floor, or in a variety of convenient locations, within the manufacturing building enabling workers to clean up using the vacuum system. The air received by vacuum system 236 through line 242 first passes through cyclone separater 246 which separates the relatively large MBOCA particles from the air stream and discharges the granules through chute 36*b* to solids recycle line 30*b***

Figure 5:
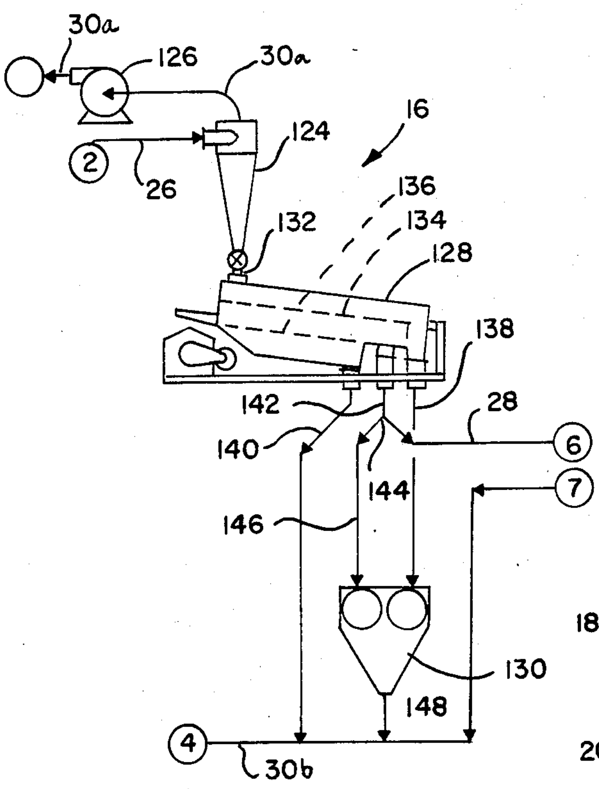
FIG. 5 is a schematic diagram of the classification system.

(see FIG. 5). The air stream continues through line 248 to dust collector 250 which removes the MBOCA dust and discharges same through chute 36*a* also to the solids recycle line. This air stream continues through line 252 to absolute filters 238. In the preferred embodiment, vacuum system 236 is that manufactured and sold under the trademark CENTRO-VAC by Kice Metal Products Company, Inc., of Wichita, Kans. Dust collector 250 of such a system provides 79 square feet of cloth area via GORETEX bags. The air exiting vacuum system 236 is caluclated as being no greater than $3.54\times10^{-5}$ pph of MBOCA dust.

Absolute filters 238 are coupled in parallel between line 256 and line 258. Similarly, blowers 240 are coupled in parallel between line 258 and stack discharge 260. Valves 262 are opened or closed so that only one of absolute filters 238 and one of blowers 240 is "on-line" at any given time. The MBOCA discharge rate through stack 260 is calculated as being no greater than $3.12\times10^{-6}$ pph.

Each of blowers 240 operates at approximately 1500 cfm to draw filtered air from the active filter 238 through line 258. Blowers 240 draw purge air through line 32 from granulation system 14, through line 256 from vacuum system 236, and through line 234 from the building. Consequently, blowers 240 maintain all of granulation system 14, classification system 16, and charging system 18 at negative pressure with respect to ambient air to prevent the particulate MBOCA from being inadvertently discharged from the system. The highest internal air pressure in system 10 is in line 120 (see FIG. 3), which is 2 to 4 inches WC below that of the ambient air. Each of absolute filters 238 comprises one prefilter and two FLANDERS filters in series.

System 10 is located within a closed building. Inlet and outlet doors (not shown) at either end of drum conveyor 168 (FIG. 6) are the only open entrances to the building. Drawing building air through line 234, which primarily enters through the conveyor doors, maintains the building interior at negative pressure, so that MBOCA does not inadvertently escape from the manufacturing environment. Preferably, damper 264 in line 234 is adjusted such that building air is drawn at approximately 1400 cfm and contains no greater than 0.0104 pph of MBOCA dust.

VI Operation Review

Figure 3:
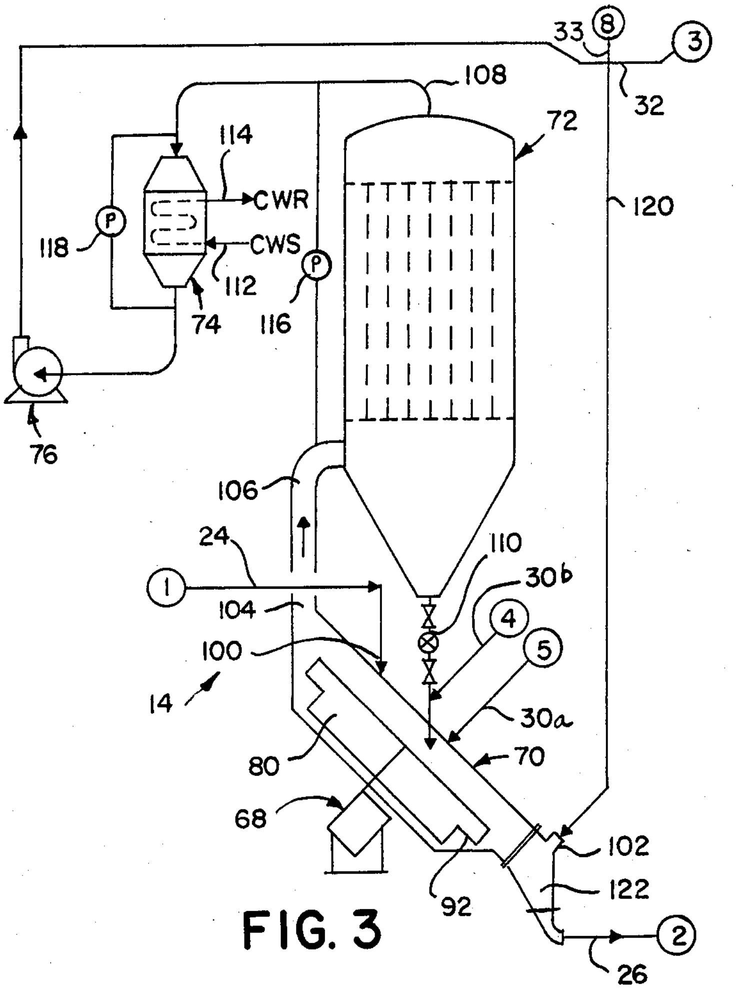
FIG. 3 is a schematic diagram of the granulation system.
Figure 4:
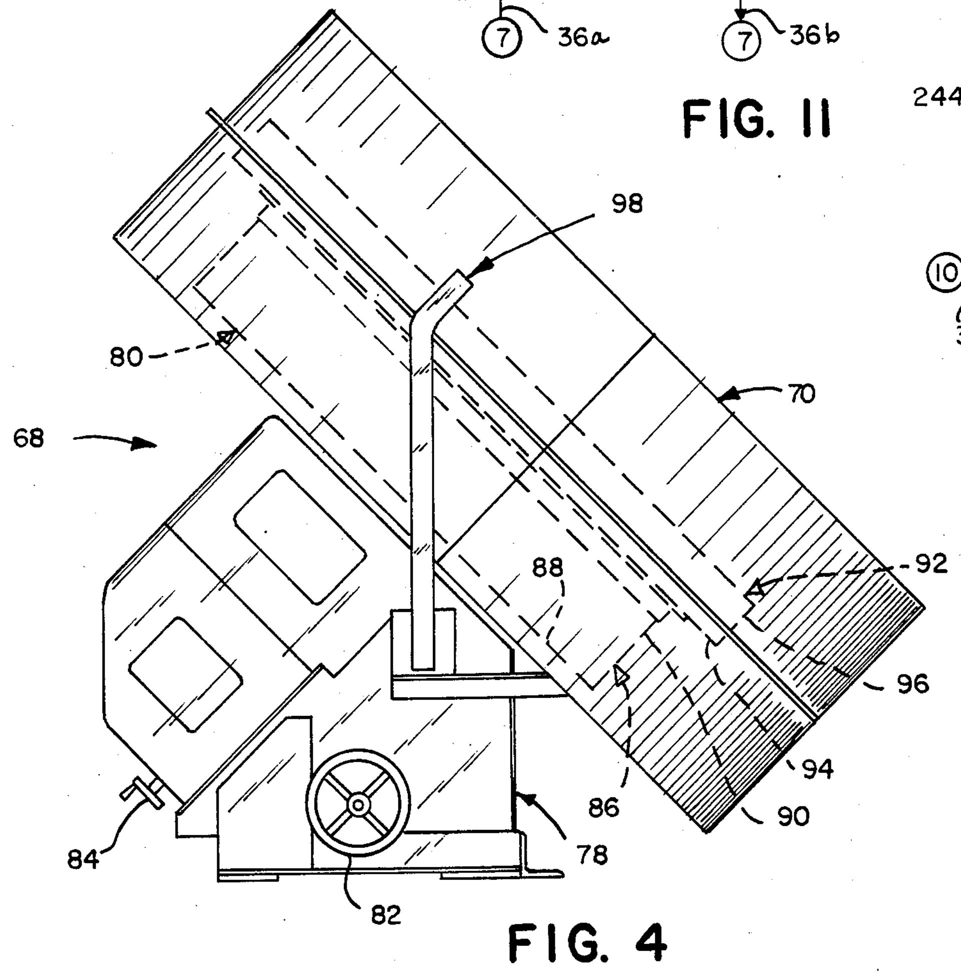
FIG. 4 is an elevational view of the pan granulator of the granulation system.

Because MBOCA is a sub or super cooler, granular MBOCA must first be introduced into pan 80 of granulator 68 before granulation will occur. A drum 154 containing granular MBOCA is transported on conveyor 168 and positioned under charging assembly 152. Tube 180 (FIG. 7) is extended until terminal end 200 engages the granular MBOCA within the drum. It may be necesssary to slide dust cup assembly 182 upwardly along tube 188 to permit discharge end 200 to be inserted into the MBOCA. Valve 194 (FIG. 6) is opened to draw the granular MBOCA from the drum and convey the MBOCA through line 34 to cyclone separator 246 (FIG. 11), which separates the granular MBOCA from the air stream and discharges the MBOCA, which falls through chute 36*b* to solids recycle line 30*b* (FIG. 5) and into pan 80 (FIG. 3). With the granular MBOCA in the pan, pan granulation is initiated by spraying liquid MBOCA into the pan through nozzle 100 (FIG. 3).

The liquid MBOCA is stored in feed tank 42 (FIG. 2) and maintained at 105 degrees Centigrade by the proper introduction of steam or cold water through lines 52 or 56, respectively, to jacket 50. Nitrogen is vented through the feed tank headspace through lines 64 and 66. The liquid MBOCA is drawn as necessary by pump 44 to be delivered to the granulation system 14.

The liquid MBOCA is sprayed into pan 80 of granulator 68 through nozzle 100 (FIG. 3). MBOCA particles therefore agglomerate within pan 80 through a coating and twinning process. The plows within the pan lift and segregate the MBOCA granules to draw the relatively large granules to the surface and expose the smaller granules to the liquid MBOCA stream. As the granules attain a size of approximately 3/16 inch to 5/16 inch, they drop into reroll ring 92 wherein they solidify and cool. After dropping out of the reroll ring, the particles are conveyed on an air stream through line 26 to classification system 16.

Continually during pan granulation, a cooling air stream is conducted through hood 70 to carry away or remove the heat of fusion. The dust is removed from the air stream in dust collector 72; and the air stream is cooled by heat exchanger 74 to be recirculated through line 120 to the pan granulator. A relatively small portion of the cooling air is purged through line 32 to filter system 20.

The MBOCA particles received by classification system 16 via line 26 (FIG. 5) are separated into undersize (e.g., smaller than 3/16 inch) particles, onsize (e.g., 3/16 inch to 5/16 inch) particles, and oversize (e.g., greater than 5/16 inch) particles. The undesired undersize and oversize particles are returned via solids recycle line 30*b* to granulation system 14. The oversize particles are crushed in crusher 130 before being returned to the granulator. Depending upon the setting of splitter 144, the onsized particles are either sent directly to container charging system 18 or are routed to crusher 130 to increase the number of nuclei within pan 80.

Figure 9:
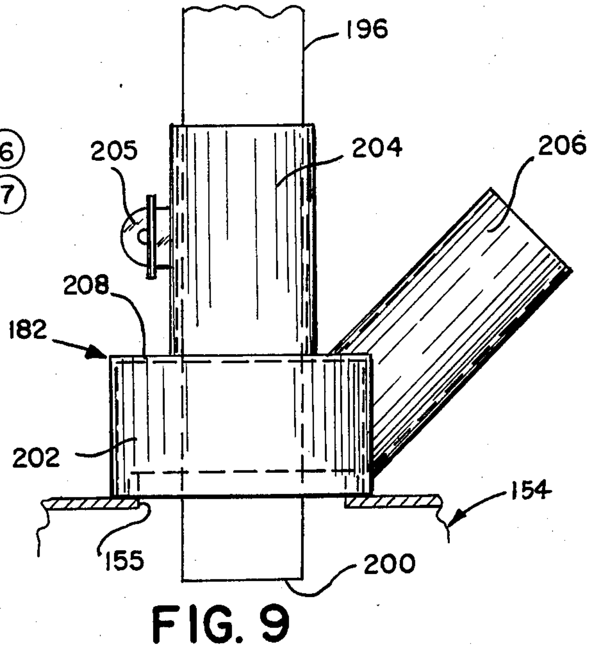
FIG. 9 is a fragmentary, elevational view of the container charging filler tube and dust cup shown in the filling position.
Figure 10:
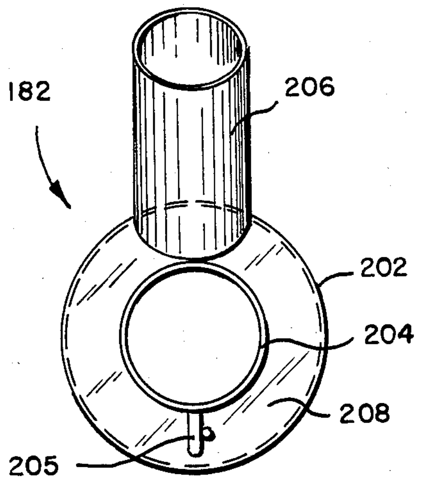
FIG. 10 is a top plan view of the dust cup.
Figure 8:
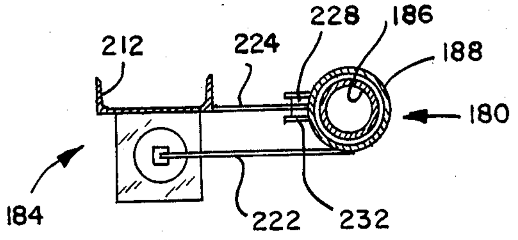
FIG. 8 is a sectional view taken along plane VIII--VIII in FIG. 7.

The onsize MBOCA particles are collected in bin 150 of container charging system 18 (FIG. 6). Individual product drums are charged with product through charging assembly 152. Drums 154 are transported sequentially along conveyor 168 to a position directly under charging assembly 152. Feed tube 180 (FIG. 7) is lowered until the lower end of the extension is positioned within the drum and the dust cup 202 surrounds bung hole 155 (FIG. 9). Valves 178 and 194 are operated to charge product from bin 150 into drum 154. Container air including any MBOCA dust therein is withdrawn through dust cup 202 and sent via line 34 to filter system 20. When a container is fully charged, valves 178 and 194 are again actuated to terminate charging and the charging assembly is withdrawn from the container. Subsequent drums are charged using the identical procedure.

Figure 11:
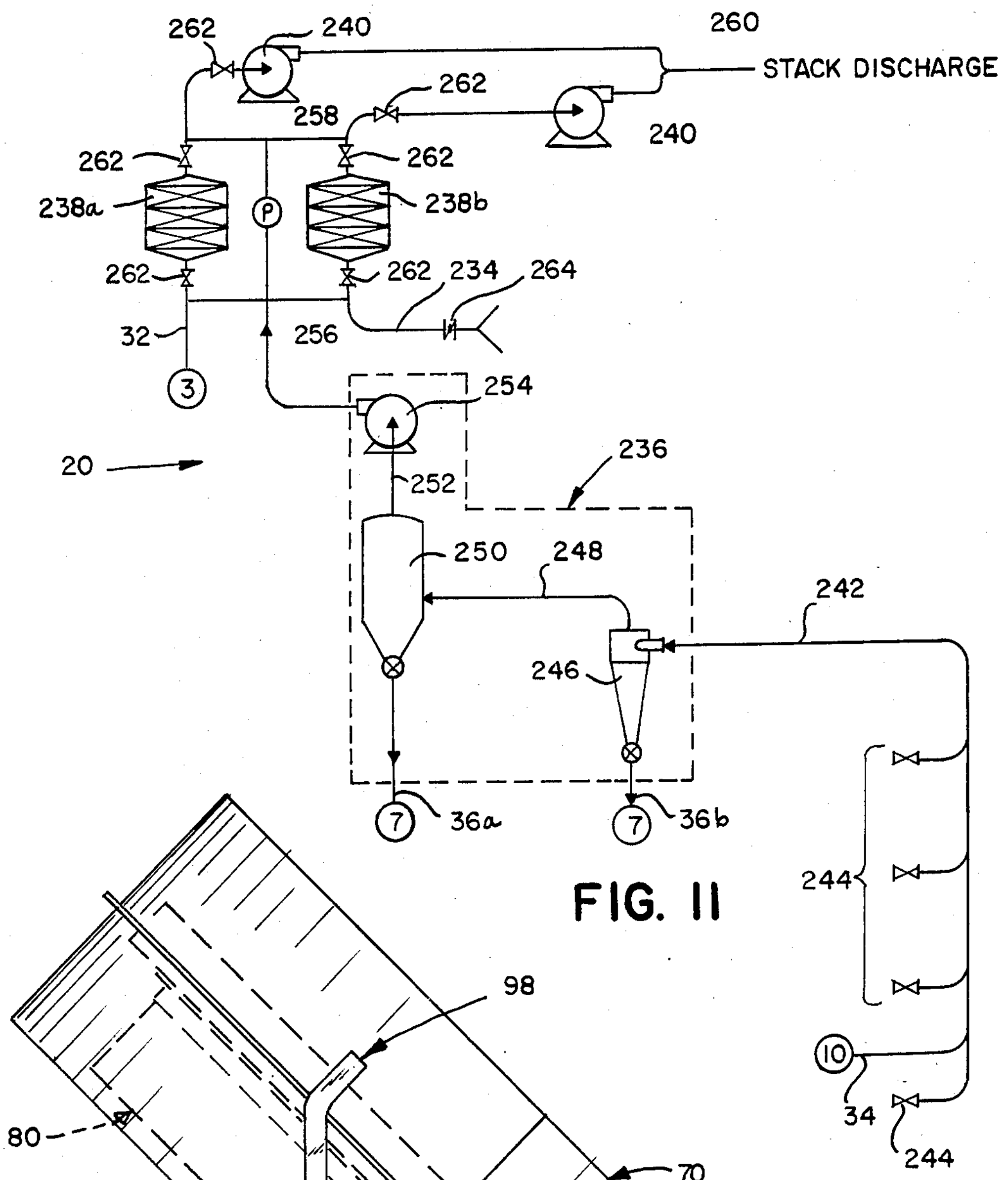
FIG. 11 is a schematic diagram of the filter system.

All air purged from system 10 passes through filter system 20 (FIG. 11). Purge air from granulation system 14, air from charging assembly 152, and building air are all drawn through absolute filters 238 and discharged to the stack through line 260. Additionally, vacuum system 236 removes MBOCA material from the air stream coming from the drum charging assembly 152 and returns the MBOCA to granulation system 14.

Accordingly, the present system produces a MBOCA product which is substantially dust free in subsequent use and therefore less likely to expose workers to MBOCA. Additionally, all air exiting the MBOCA manufacturing environment is filtered before being discharged to the atmosphere. The charge drums are relatively clean due to the unique charging system which substantially prevents MBOCA dust from accumulating on the drum exteriors.

The above description is that of a preferred embodiment of the invention. Various alterations and changes can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A method of producing a MBOCA product having granules substantially all of a desired size, said method comprising:

agglomerating MBOCA in an enclosed agglomeration means to produce granular MBOCA and incidentally producing MBOCA dust;

circulating an enclosed gaseous stream through the agglomeration means to carry away the heat of fusion and MBOCA dust;

cooling the gaseous stream;

removing MBOCA dust from the gaseous stream; and classifying the granulated MBOCA to separate the MBOCA product having granules of a desired size from granules having an undesired size.

2. A method as defined in claim 1 wherein said agglomerating step includes agitating MBOCA granules and introducing liquid MBOCA onto the agitating granules to produce larger granules.

3. A method as defined in claim 2 wherein said agglomerating comprises pan granulating the MBOCA.

4. A method as defined in claim 3 wherein said pan granulating includes rerolling the granular MBOCA within a reroll ring on the pan granular to solidify and cool the granular MBOCA.

5. A method as defined in claim 1 further comprising returning the MBOCA granules of the undesired size to the agglomeration means.

6. A method as defined in claim 5 wherein the undesired MBOCA granule size is both smaller and larger than the desired MBOCA granule size.

7. A method as defined in claim 6 wherein said returning comprises crushing the undesired MBOCA granules which are larger than the desired size before returning the granules to the granulator.

8. A method as defined in claim 1 further comprising maintaining the enclosed gaseous stream at negative pressure relative to the ambient air to reduce the likelihood that MBOCA dust within the air stream will escape to the ambient air.

9. A method as defined in claim 8, wherein said maintaining step includes drawing a portion of the enclosed gaseous stream through air filter means.

10. A system for producing a MBOCA product having granules of a desired size comprising:

agglomeration means for agglomerating MBOCA;

a dust hood enclosing said agglomeration means;

air calculation means for circulating an enclosed air stream through said dust hood to carry away the heat of fusion and MBOCA dust, said air circulation means including cooling means for cooling the air stream and dust collector means for removing MBOCA dust from the air stream; and classifying means for classifying the granular MBOCA into granules of a desired size and granules of an undesired size.

11. A MBOCA production system as defined in claim 10 wherein said classifying means includes means for returning the undesired granules to said agglomerator means.

12. A MBOCA production system as defined in claim 10 wherein said air circulation means further includes means for returning the MBOCA dust to said agglomerator means.

13. A MBOCA production system as defined in claim 10 wherein said agglomerator means includes a rotatable pan having a reroll ring about is periphery into which granules fall for cooling.

14. A MBOCA production system as defined in claim 11 wherein the undesired granules are both larger than and smaller than the desired granules, and further wherein said returning means includes crusher means for crushing the undesired large granules before returning such granules to the pan.

15. A MBOCA production system as defined in claim 10 further comprising:

building means for substantially enclosing said system;

air filter means; and air moving means for drawing air from said building means through said air filter means to maintain said building means at negative pressure.

16. A MBOCA production system as defined in claim 15 wherein said air moving means includes means for moving a portion of the enclosed air stream through said air filter means.

17. A MBOCA production system as defined in claim 10 further comprising bin means for collecting the desired MBOCA granules comprising the MBOCA product.

18. A MBOCA production system as defined in claim 10 wherein said agglomeration means includes:

agitator means for agitating MBOCA granules; and dispensing means for dispensing liquid MBOCA onto the agitating granules.

19. A method of producing a granular MBOCA product comprising:

agitating MBOCA granules;

dispensing liquid MBOCA onto the agitating granules to agglomerate larger MBOCA granules;

classifying the agglomerated MBOCA granules into granules having a desired size and granules having an undesired size; and collecting the desired MBOCA granules as the MBOCA product.

20. A method as defined in claim 19 wherein said agitating includes rotating the granules within a container about an axis inclined from the vertical.

21. A method as defined in claim 20 wherein said agitating further includes the MBOCA granules within the container.

22. A method as defined in claim 21 wherein said agitating further includes rerolling the agglomerated MBOCA granules.

23. A method as defined in claim 19 further comprising:

enclosing the agitating granules within a dust hood; and circulating an enclosed gaseous stream through the hood to carry away the heat of fusion of the MBOCA.

24. A method as defined in claim 23 further comprising removing any MBOCA dust from the gaseous stream and returning such dust to the agitating granules.

25. A method as defined in claim 23 further comprising removing heat from the gaseous stream.

26. A method as defined in claim 23 further comprising purging a portion of the gaseous stream to the atmosphere through air filter means to maintain the gaseous stream at negative pressure relative to the ambient air.

27. A method as defined in claim 19 wherein the undesired MBOCA granules are both smaller than and larger than the desired MBOCA granules.

28. A method as defined in claim 27 further comprising returning the undesired MBOCA granules to the agitating granules.

29. A method as defined in claim 28 wherein said returning step includes crushing the large undesired MBOCA granules.

30. A method as defined in claim 19 wherein said collecting step comprises passing a gaseous stream counter to the desired product flow to strip dust from the product.

31. A system for producing a particulate MBOCA product wherein substantially all of the particles are within a desired size range, said system comprising:

a granulator including an airtight dust hood having an air inlet, an air outlet, a product return inlet, and a product outlet;

airtight circulation means coupled to said granulator for circulating an air stream through said hood from said air inlet to said air outlet, said air circulation means including a purge air outlet;

airtight classifying means receiving MBOCA particles from said granulator and for separating the particles by size into desired particles and undesired particles, said classifying means including a product inlet coupled to said product outlet of said granulator, an undesired product return outlet coupled to said product return inlet of said granulator, and a desired product outlet;

an airtight product bin including a product inlet coupled to said desired product outlet of said classifying means; and filter means including an air inlet coupled to said purge air outlet of said air circulation means for filtering purge air received therefrom, whereby said system is substantially airtight with the exception of air purged through said filter means to reduce MBOCA emissions from said system.

32. A system as defined in claim 31 further comprising blower means for maintaining said system at negative pressure relative to the ambient air.

33. A system as defined in claim 32 wherein said bin is coupled to said classifying means through a chute, and further comprising means for passing air through said chute opposite to the flow of the desired MBOCA product to strip MBOCA dust therefrom.

34. A system for producing a MBOCA product having granules of a desired size comprising:

agitating means for agitating the MBOCA granules;

dispensing means for dispensing liquid MBOCA onto the agitating granules to agglomerate larger MBOCA granules;

classifying means for classifying the agglomerated MBOCA granules into granules having a desired size and granules having an undesired size; and collecting means for collecting the desired MBOCA granules as the MBOCA product.

35. A MBOCA production system as defined in claim 34 wherein said agitating means includes a container means for containing the granules and rotating means for rotating the container means about an axis inclined from the vertical.

36. A MBOCA production system as defined in claim 35 wherein said agitating means further includes plowing means for plowing the MBOCA granules within the container means.

37. A MBOCA production system as defined in claim 36 wherein said agitating means further includes rerolling means for rerolling the agglomerated MBOCA granules.

38. A MBOCA production system as defined in claim 34 further comprising:

dust hood means for enclosing the agitating granules; and circulating means for circulating an enclosed gaseous stream through the dust hood means to carry away the heat of fusion of the MBOCA and MBOCA dust.

39. A MBOCA production system as defined in claim 38 further comprising filter means for removing MBOCA dust from the gaseous stream and returning such dust to the agitating granules.

40. A MBOCA production system as defined in claim 38 further comprising cooling means for removing heat from the gaseous stream.

41. A MBOCA production system as defined in claim 38 further comprising purge means for purging a portion of the gaseous stream to the atmosphere through air filter means to maintain the gaseous stream at negative pressure relative to the ambient air.

42. A MBOCA production system as defined in claim 34 wherein the undesired MBOCA granules are both smaller than and larger than the desired MBOCA granules.

43. A MBOCA production system as defined in claim 42 further comprising return means for returning the undesired MBOCA granules to the agitating granules.

44. A MBOCA production system as defined in claim 43 wherein said return means includes crusher means for crushing the large undesired MBOCA granules.

45. A MBOCA production system as defined in claim 34 wherein said collecting means includes stripping means for passing a gaseous stream counter to the desired product flow to strip dust from the product.

* * * * *